(12) United States Patent
Greene

(10) Patent No.: US 8,028,959 B2
(45) Date of Patent: *Oct. 4, 2011

(54) AUTOMATIC RECYCLING ICE DETECTOR

(75) Inventor: Leonard M. Greene, Mamaroneck, NY (US)

(73) Assignee: Safe Flight Instrument Corporation, White Plains, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/913,531

(22) Filed: Oct. 27, 2010

(65) Prior Publication Data

US 2011/0036948 A1 Feb. 17, 2011

Related U.S. Application Data

(62) Division of application No. 11/471,584, filed on Jun. 21, 2006, now Pat. No. 7,828,247.

(60) Provisional application No. 60/758,216, filed on Jan. 12, 2006.

(51) Int. Cl.
*B64D 15/20* (2006.01)

(52) U.S. Cl. ............... 244/134 F; 244/134 R; 340/962; 60/39.093

(58) Field of Classification Search ............... 244/134 R, 244/134 B, 134 C, 134 D, 134 F; 60/39.093; 340/962, 580, 583, 581

See application file for complete search history.

(56) References Cited

U.S. PATENT DOCUMENTS

| | | |
|---|---|---|
| 3,305,851 A | 2/1967 | Brandtszteter |
| 3,571,709 A | 3/1971 | Gaertner |
| 4,036,457 A | 7/1977 | Volkner et al. |
| 4,333,004 A | 6/1982 | Forgue et al. |
| 4,688,185 A | 8/1987 | Magenheim et al. |
| 4,755,062 A | 7/1988 | Meyer |
| 4,980,673 A | 12/1990 | Kleven |
| 5,206,806 A | 4/1993 | Gerardi et al. |
| 5,243,185 A | 9/1993 | Blackwood |
| 5,394,340 A | 2/1995 | Inkpen et al. |
| 5,474,261 A | 12/1995 | Stolarczyk et al. |
| 5,521,584 A | 5/1996 | Ortolano et al. |
| 5,523,959 A | 6/1996 | Seegmiller |
| 5,709,470 A | 1/1998 | Finley |
| 5,886,256 A | 3/1999 | DeAnna |
| 6,328,467 B1 | 12/2001 | Keyhani |
| 6,731,225 B2 | 5/2004 | Vopat |
| 7,439,877 B1 | 10/2008 | Jarvinen |
| 7,586,419 B2 | 9/2009 | Ikiades et al. |
| 2003/0155467 A1 | 8/2003 | Petrenko |
| 2003/0169186 A1 | 9/2003 | Vopat |

OTHER PUBLICATIONS

Greene, U.S. Office Action mailed Oct. 27, 2009 directed to U.S. Appl. No. 11/471,584; 15 pages.

Greene, U.S. Office Action mailed Jun. 23, 2010 directed to U.S. Appl. No. 11/471,584; 17 pages.

*Primary Examiner* — Benjamin P Lee
(74) *Attorney, Agent, or Firm* — Morrison & Foerster, LLP

(57) ABSTRACT

An automatic recycling ice detector includes a sensor for sensing the formation of ice on an aircraft surface and a heater for melting the detected ice. The detector also includes a timing circuit for indicating the time to melt any detected ice and automatically recycling the detector when the ice is melted. A computer including a look up table or the like are provided for measuring and indicating the thickness of the accumulated ice based on a relationship between melting time and thickness.

14 Claims, 3 Drawing Sheets ic detector (AUTOMATIC RECYCLING ICE DETECTOR)

CROSS-REFERENCE TO RELATED APPLICATIONS

This is a divisional application of U.S. patent application Ser. No. 11/471,584, filed Jun. 21, 2006, now U.S. Pat. No. 7,828,247, issuing Nov. 9, 2010, which claims the benefit of Provisional Application No. 60/758,216, filed Jan. 12, 2006, the disclosure of which is herein incorporated by reference in its entirety.

FIELD OF THE INVENTION

This invention relates to an automatic recycling ice detector and more particularly to an automatic recycling ice detector that indicates total ice accumulation.

BACKGROUND OF THE INVENTION

The accumulation of ice on various surfaces of an aircraft can produce disastrous results. Accordingly it is important for a pilot to know when ice starts to appear and to take measures to avoid serious consequences. For example, the pilot may turn on surface heaters, make changes in speed or elevation, changes in the angle of attack and/or seek the nearest airport before the problem becomes critical. Further, it is important for a pilot to know when accumulated ice in a dangerous amount has formed on the surface of the aircraft.

Ice detectors are known. For example, a patent of Gaertner, U.S. Pat. No. 3,571,709 discloses a detector for measuring icing rates over a plurality of periods of time. As disclosed therein, an icing rate detector utilizes an icing switch and a heater, which are mounted on the outside of an aircraft. When ice forms on the switch, it closes and energizes a heater, which then melts the ice and causes the switch to open. The heater thus is cycled on and off when the aircraft is subjected to icing conditions. A rate detector circuit measures the rate at which power is consumed over a fifteen second period and over a two-minute period. These rates are directly proportional to the rate at which ice is formed on the aircraft.

A more recent patent of Mayer, U.S. Pat. No. 4,755,062 discloses a process and measuring probe for the determination of ice or snow formation. As disclosed therein, the heat abstraction intensely occurring due to ice or snow is measured and used as a signal for ice or snow formation. A current meter for determining increased power consumption determines the intensified heat abstraction on the cold conductor. The intensified heat abstraction on the cold conductor is determined by a current meter for determining increased power consumption or by a thermister which is an heat conducted connection with a cold conductor and switches the power supply of the cold conductor on and off as a function of the temperature.

Notwithstanding the above, it is presently believed that there may be a large commercial market for an improved ice detector in accordance with the present invention. A commercial market should develop because the improved system and element in accordance with the present invention warn a pilot of hazardous icing conditions; enable a pilot to determine the thickness of the ice as well as the condition when icing may be at a relatively high rate. In addition, ice detectors in accordance with the present invention indicate the total ice accumulated on the aircraft. It is also presently believed that such systems can be manufactured and sold at a competitive cost, can be readily installed on new aircraft as well a retrofitted on existing aircraft, are compact, durable, accurate and readily serviced. Further advantages will become evident from the following specification.

BRIEF SUMMARY OF THE INVENTION

In essence the present invention contemplates an automatic recycling ice detector and ice accumulation indicator for an aircraft. The detector and indicator include sensing means for sensing the formation of ice on a surface of an aircraft and an electric heater and circuit is also provided for melting detected ice on the selected surface. A timer or a timing circuit indicates the time required for melting the sensed ice. In the present invention, means are provided for automatically activating the sensing means when detected ice has been melted and means for calculating the thickness of ice formed on the surface of the aircraft based on a summation of the times required to melt detected ice. Further, an indicator indicates to the pilot the formation of ice and thickness accumulated. Finally, the time for melting the ice can also be used as an indication of the rate of ice formation.

The invention also contemplates a method for warning a pilot of accumulated ice on the surface of an aircraft. The method includes the step of providing a sensor for detecting the formation of ice on selected portions of a surface on an aircraft and an electric heater for melting the detected ice. In addition, the method includes the step of detecting ice formed on the selected surface of the aircraft and energizing the heater to thereby melt the ice. A timer is provided and an interval of time from the initiation of a heating cycle until the ice on the selected portion of the surface of the aircraft is determined. Further, any subsequent formation of ice on the selected portion of the surface of the aircraft is sensed and the heater energized to melt the subsequent formation of ice. The interval from energizing the heater until ice is no longer sensed is timed, and the times for melting ice are summed. The method also contemplates providing means such as a microprocessor, the output of which represents the amount of ice deposited as a function of a predetermined relationship between ice deposition and the timing of its melting. Based on the use of a look up table or the like the thickness of the ice is indicated for the pilot.

The invention will now be described in connection with the accompanying figures wherein like reference numerals are used to display like parts.

DESCRIPTION OF THE PREFERRED EMBODIMENTS OF THE INVENTION

Figure 1:
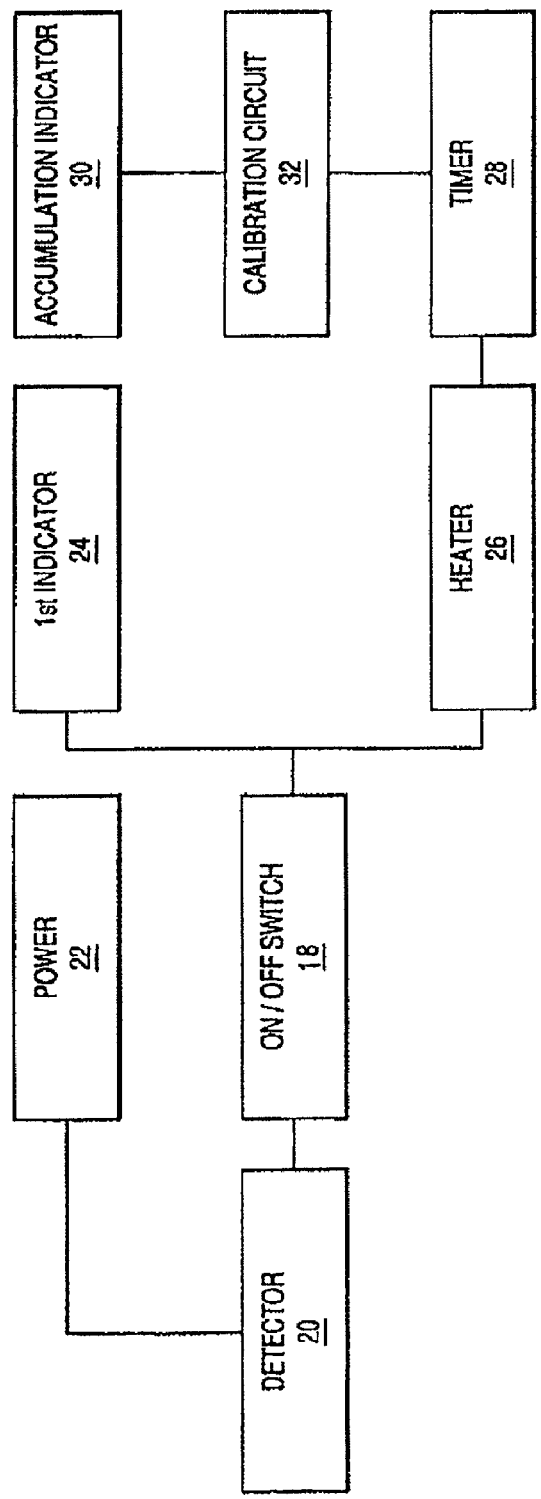
FIG. 1 is a block diagram that illustrates a first embodiment of the invention.

Referring now to the drawings, FIG. 1 illustrates an automatic recycling ice detector and ice accumulation indicator for an aircraft that includes an ice detector or sensor 20 and a source of electrical power 22 for energizing the ice detector 20. The ice detector or sensor 20 may be in the form of a thermoelectric switch that is mounted on the outer surface of an aircraft. For example, when ice forms on the switch, it closes a circuit to a heater, which then melts the ice on the switch. Other conventional sensors or detectors such as optical sensors etc. may also be used to detect the formation of ice.

In the present invention, the detector 20 is connected in parallel to a first indicator 24 and heater 26 by an on/off switch 18, so that, the presence of ice simultaneously energizes the heater 26 and a first indicator 24 that warns a pilot that the heater 26 is on and that ice is forming on the aircraft. The heater 26 is connected to a timing circuit or timer 28 that measures the time from the formation of ice on the heater 26 until the heater 26 is turned off. In other words, the timing circuit or timer 28 measures the interval of time between the formations of ice on the heater 26 until the ice is melted.

The timing circuit or timer 28 outputs a signal to an ice accumulation indicator 30 that indicates the total time that the heater 26 is on during a flight as an indication of the amount of accumulated ice on the aircraft. In one embodiment of the invention, the signal from the timing circuit or timer 28 is fed to a calibration circuit 32, which converts the time for melting accumulated ice to the amount of ice formed on the heater and consequently on an area adjacent to the heater 26. The calibration circuit can convert the ice to thickness of ice and/or the weight of accumulated ice based on the aircraft surfaces.

Figure 2:
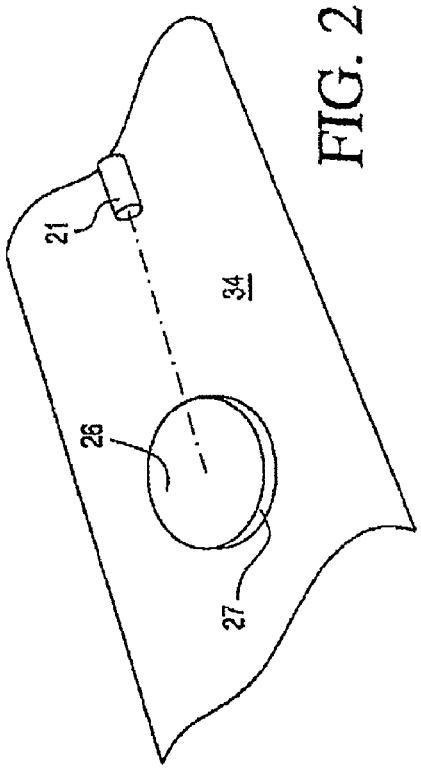
FIG. 2 is a schematic illustration of the invention.

FIG. 2 illustrates an exposed surface 34 of an aircraft with a disc shaped heater 26 thereon. The disc shaped heater 26 includes an insulating layer 27 between the heater 26 and the surrounding surface 34 to isolate the heater 26 from the surrounding area. An optical ice detector 21 is shown schematically and is disposed on the aircraft at a distance from the heater 26.

Figure 3:
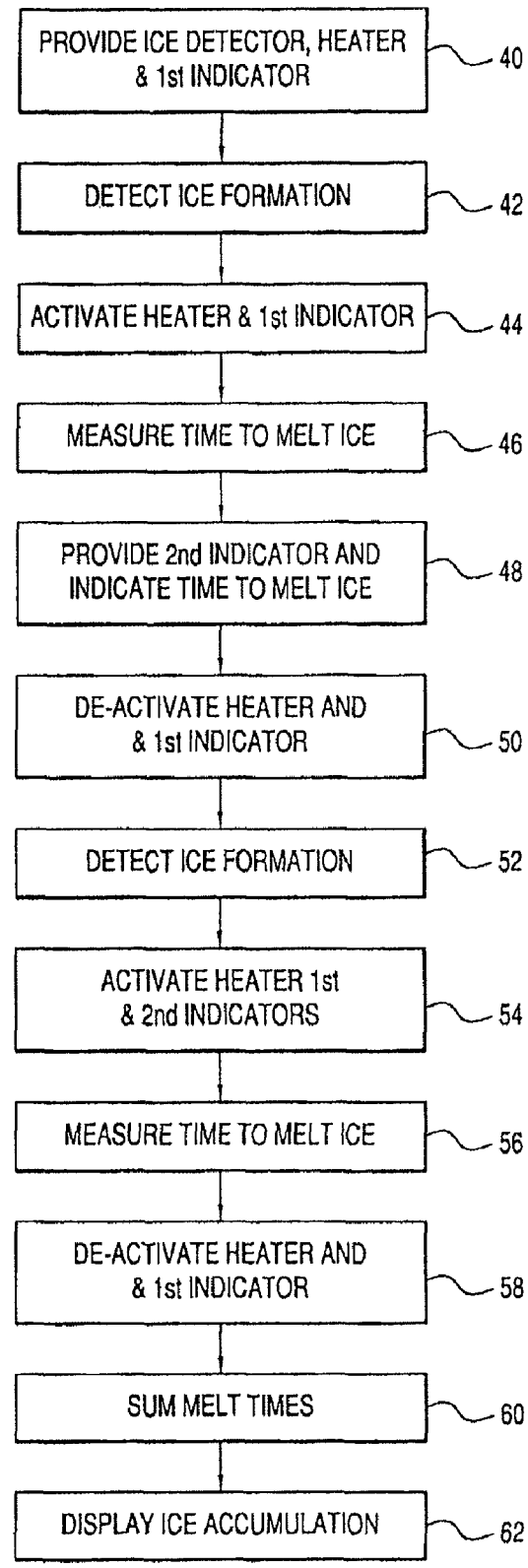
FIG. 3 is block diagram that illustrates the operation of a preferred embodiment of the present invention.

The operation of an automatic recycling ice detector and ice accumulation indicator will now be described in connection with FIG. 3. As illustrated, an ice sensor, heater and first indicator are provided in a first step 40. The sensor then senses or detects the formation of ice in a step 42 on an exposed surface of the heater. This detection of ice automatically and simultaneously activates the heater and first indicator in step 44. This first indicator provided in the cockpit of the airplane alerts a pilot of the formation of ice on the aircraft.

A timer or timing circuit measures the time to melt the ice in step 46 and in step 48 a second indicator displays the time to melt the ice as an indication of the amount of ice accumulated on the surface of the aircraft. A calibration circuit may also be provided to indicate the thickness or weight of the ice on the aircraft. In addition, a warning may be sounded when a hazardous amount of ice has been accumulated on the aircraft.

When the ice is melted the heater and first indicator are automatically turned off in step 50 and the system detects any subsequent formation of ice in step 52. The subsequent detection of ice again activates the heater and first and second indicators in step 54. The time to melt the subsequent formation of ice is measured in step 56. Immediately upon the melting of the ice, the heater and first indicator are deactivated in step 58 and the time for melting the ice is summed in steps 60. The total time is an indication of ice accumulated on the aircraft.

Figure 4:
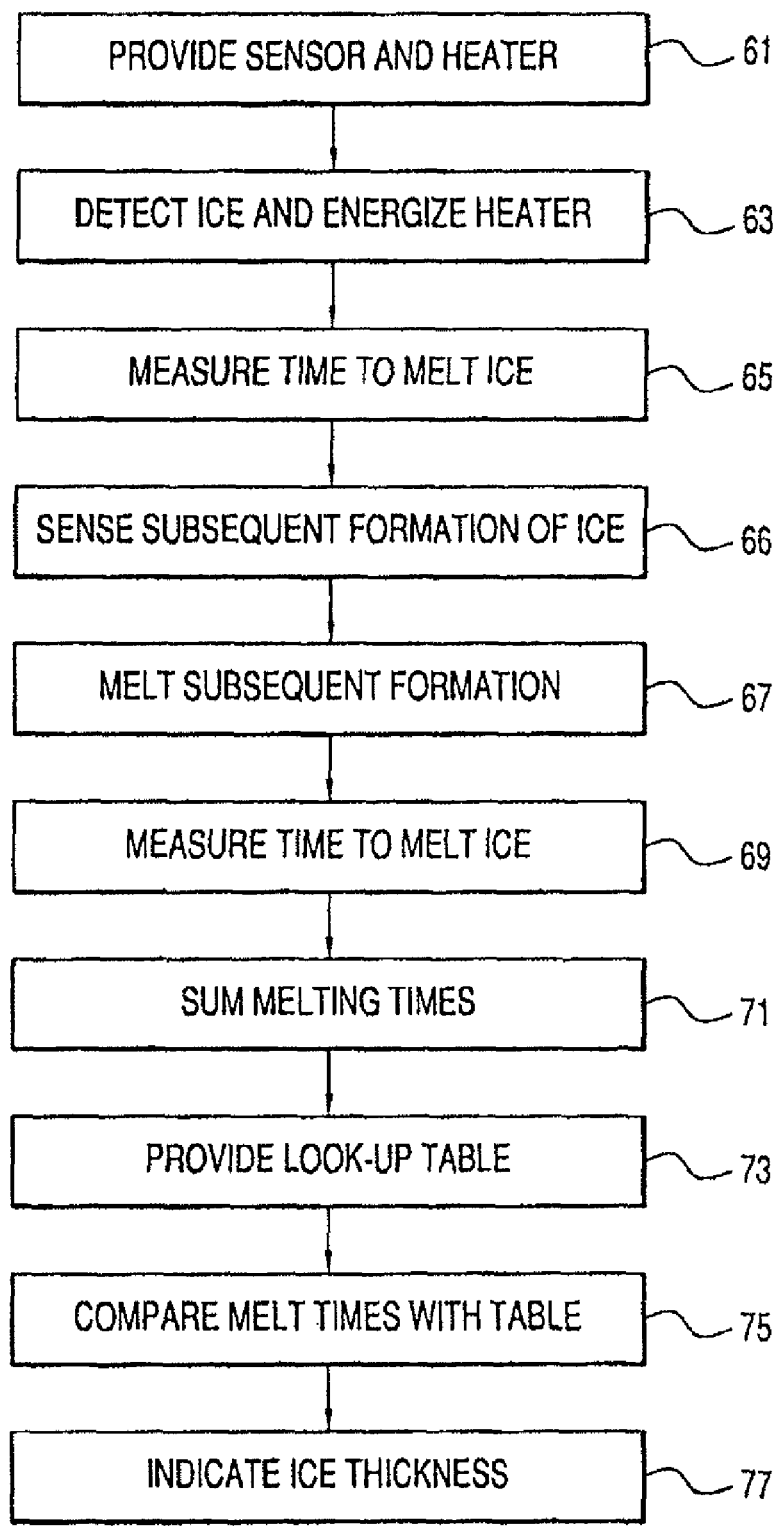
FIG. 4 is a block diagram illustrating a method in accordance with the present invention.

FIG. 4 illustrates a method in accordance with a further embodiment of the invention. As illustrated the method includes the steps of providing an ice sensor or detector for detecting the formation of ice on the surface of an aircraft and a heater for melting the detected ice in step 61. In step 63 ice formed on the surface of the heater is detected and the heater is energized to melt the ice. In step 65 the time of melting the ice is measured and the system is continually returned to a sensing mode to detect any subsequent formation of ice in step 66. In step 67 any subsequently formed ice is melted and the time of melting the subsequently formed ice is measured in step 69. The times for melting the ice are summed in step 71 as an indication of the accumulated thickness of the ice on the aircraft. It is also contemplated to provide a look-up table for converting melt time to ice thickness in step 73 and comparing the melt time with the look-up table in step 75 and then indicting the thickness or weight of accumulated ice to the pilot in step 77.

While the invention has been described in connection with its preferred embodiments, it should be recognized that changes and modifications may be made therein without departing from the scope of the appended claims.

The invention claimed is:

1. A method for detecting accumulated ice on an aircraft, comprising:
   sensing ice formed on a surface of an aircraft using a sensor;
   energizing a heater to melt the sensed ice;
   timing a first interval from energizing the heater until ice on the surface of the aircraft is no longer sensed using a microprocessor;
   sensing any subsequent formation of ice on the surface of the aircraft and energizing the heater to melt the sensed ice;
   timing a second interval from energizing the heater until ice on the surface of the aircraft is no longer sensed using the microprocessor; and
   determining a total melt time by summing the first interval and the second interval using the microprocessor.

2. The method of claim 1, comprising indicating the total melt time to a pilot of the aircraft via a first indicator.

3. The method of claim 1, comprising sounding a warning when the total melt time exceeds a predetermined value.

4. The method of claim 1, comprising determining total ice accumulation based on the total melt time.

5. The method of claim 4, wherein the total ice accumulation is determined by comparing total melt time to values in a look up table which define a relationship between melt time and an amount of ice accumulation.

6. The method of claim 4, comprising indicating the total ice accumulation to a pilot of the aircraft via a first indicator.

7. The method of claim 4, comprising sounding a warning when the total ice accumulation exceeds a predetermined value.

8. The method of claim 4, comprising indicating a weight of the total ice accumulation to a pilot of the aircraft via a first indicator.

9. The method of claim 4, comprising indicating a thickness of the total ice accumulation to a pilot of the aircraft via a first indicator.

10. The method of claim 1, comprising indicating that ice has been sensed on the surface of the aircraft to a pilot of the aircraft via a second indicator.

11. The method of claim 1, wherein the sensor comprises a thermoelectric switch mounted on the surface of the aircraft.

12. The method of claim 11, wherein the formation of ice on the thermoelectric switch closes a circuit to simultaneously energize the heater and cause a second indicator to indicate to a pilot of the aircraft that ice has been sensed on the surface of the aircraft.

13. The method of claim 1, wherein the heater comprises a relatively flat disc shaped plate conforming to the surface of the aircraft and insulation means for separating the plate from a surrounding surface of the aircraft.

14. A non-transitory computer readable medium storing a computer program to cause a system of an aircraft to execute steps comprising:

sensing ice formed on a surface of an aircraft using a sensor;
energizing a heater to melt the sensed ice;
timing a first interval from energizing the heater until ice on the surface of the aircraft is no longer sensed;
sensing any subsequent formation of ice on the surface of the aircraft and energizing the heater to melt the sensed ice;
timing a second interval from energizing the heater until ice on the surface of the aircraft is no longer sensed; and
determining a total melt time by summing the first interval and the second interval.

* * * * *

UNITED STATES PATENT AND TRADEMARK OFFICE
CERTIFICATE OF CORRECTION

PATENT NO. : 8,028,959 B2
APPLICATION NO. : 12/913531
DATED : October 4, 2011
INVENTOR(S) : Leonard M. Greene Page 1 of 1

It is certified that error appears in the above-identified patent and that said Letters Patent is hereby corrected as shown below:

At column 4, line 7, please delete "indicting" and insert --indicating--

Signed and Sealed this
Twentieth Day of December, 2011

David J. Kappos
*Director of the United States Patent and Trademark Office*